United States Patent
Li et al.

(10) Patent No.: US 10,209,049 B2
(45) Date of Patent: Feb. 19, 2019

(54) FABRICATION AND MONITORING DEVICE FOR MICRO PROBE BALL TIP

(71) Applicant: HEFEI UNIVERSITY OF TECHNOLOGY, Hefei, Anhui (CN)

(72) Inventors: Ruijun Li, Anhui (CN); Zhenying Cheng, Anhui (CN); Chen Chen, Anhui (CN); Kuangchao Fan, Hefei (CN)

(73) Assignee: HEFEI UNIVERSITY OF TECHNOLOGY, Hefei, Anhui (CN)

( * ) Notice: Subject to any disclaimer, the term of this patent is extended or adjusted under 35 U.S.C. 154(b) by 148 days.

(21) Appl. No.: 15/587,380

(22) Filed: May 4, 2017

(65) Prior Publication Data
US 2017/0232543 A1    Aug. 17, 2017

(30) Foreign Application Priority Data
May 4, 2016  (CN) .......................... 2016 1 0302455

(51) Int. Cl.
*G01B 5/012*   (2006.01)
*G01B 1/00*    (2006.01)
*B21K 1/02*    (2006.01)

(52) U.S. Cl.
CPC .............. *G01B 5/012* (2013.01); *G01B 1/00* (2013.01); *B21K 1/02* (2013.01)

(58) Field of Classification Search
USPC .......................................................... 29/899
See application file for complete search history.

(56) References Cited

U.S. PATENT DOCUMENTS

| | | | | |
|---|---|---|---|---|
| 6,145,361 A | * | 11/2000 | Wengenroth ............. | B21H 1/14 72/72 |
| 8,615,885 B2 | * | 12/2013 | Besenbeck ............... | B21K 1/02 29/898 |
| 2016/0195383 A1 | * | 7/2016 | Smith ..................... | G01B 5/012 33/502 |

\* cited by examiner

*Primary Examiner* — John Fox

(57) ABSTRACT

A fabrication and monitoring device for micro probe ball tips includes a magnetic field generator, a 3-dimensional displacement adjusting mechanism, a wire supplier and an image monitoring system. The magnetic field generator includes a U-shaped electromagnet. The 3-dimensional displacement adjusting mechanism includes a 2-dimensional moving platform, a 1-dimensional moving platform, a guiding tube, and a sparking plug. The wire supplier includes a transmission wheel, a pressing roller, a wire feeding roller and a tungsten wire material supplier. The image monitoring system includes a micro objective, a third-generation infinite beam structure lens and a supporting frame. The present invention overcomes an eccentric problem of a tungsten ball and a tungsten rod, and also overcomes a sphericity problem caused by gravity, so as to improve sphericity, eccentric accuracy and enable monitoring of dynamic manufacturing process of the probe ball tips.

6 Claims, 6 Drawing Sheets

FABRICATION AND MONITORING DEVICE FOR MICRO PROBE BALL TIP

CROSS REFERENCE OF RELATED APPLICATION

The present invention claims priority under 35 U.S.C. 119(a-d) to CN 201610302455.8, filed May. 4, 2016.

BACKGROUND OF THE PRESENT INVENTION

Field of Invention

The present invention relates to a fabrication device for micro/nano probe ball tips of a 3-dimensional coordinate measuring machine, and more particularly to a fabrication and monitoring device of micro probe ball tips.

Description of Related Arts

Since late 1980s, microfabrication technology had been continuously improved, which promoted the rapid progress and development of micro-mechanical, micro-electromechanical systems (MEMS) and other emerging disciplines. Micromachines and MEMS devices appeared in large numbers. Because of their geometric feature sizes between tens of micrometers to a few millimeters, measurement uncertainty is required to reach tens of nanometers to hundreds of nanometers. As a result, high-precision measurement of micro device geometry sizes is especially important. Conventionally, there are two categories of widely used measuring instruments: firstly, non-contact measuring instruments such as white light interferometer, digital holographic microscopy, scanning probe microscopy, atomic force microscopy, and other surface nondestructive measurement devices. However, these methods are unable to measure the three dimensional sizes with high aspect ratio, such as deep holes, side walls, ramps and the like; secondly, contact measuring instruments, mainly micro/nano coordinate measuring machines.

In micro/nano coordinate measuring machine, high-precision probe system directly affects the accuracy of the results. The probe stylus consists of a probe shaft and a probe ball tip. Conventionally, the probe shaft and the probe ball tip are most commonly connected by adhesive. Generally, a hole is drilled on the probe ball, and then the probe shaft is glued inside the hole on the probe ball. However, the hole on the probe ball may lead to deformation when the probe ball is glued on a bolt, resulting in sphericity decrease. In order to ensure no deformation of the probe ball during assembly, conventional probe is manufactured by gluing the undrilled probe ball in a spherical cup holder. Meanwhile, the probe ball and the probe shaft are not coaxial, which will produce eccentric error, so accuracy is not high enough.

With the widespread of high-precision coordinate measuring machine, probe ball specifications have become an important factor of statistical error budget. Especially, when measured parts with high aspect ratio, a probe ball with a diameter of less than 100 microns are needed (wherein conventionally, commercially available probe balls of probes for 3-dimensional coordinate measuring machine are all larger than 300 microns).

Conventionally, micro probe ball tip fabrication methods are as follows: WEDG-OPED (wire electrode grinding—one pulse electro discharge), MicroEcm-OPED (micro-electrochemical etching—one pulse electro discharge), LBM (Laser thermal processing), capillary tip molding, and optical fiber melting. For WEDG-OPED, the smallest diameter of the probe ball is 40 um. For Micro Ecm-OPED, the smallest diameter of the probe ball is 30 um. For LBM, the smallest diameter of the probe ball is 19.69 um. For capillary tip molding, the smallest diameter of the probe ball is 3 mm. For optical fiber melting, the smallest diameter of the probe ball is 30 um. Sphericity and eccentricity of probe ball tips processed by conventional methods are all several microns, which is not able to meet the needs of high-precision measurements.

SUMMARY OF THE PRESENT INVENTION

An object of the present invention is to provide a fabrication and monitoring device for micro probe ball tips, so as to overcome a problem that the micro probe ball tips manufactured by conventional methods are not able to satisfy requirements of high-precision measurements.

Accordingly, in order to accomplish the above object, the present invention provides a fabrication and monitoring device for micro probe ball tips, comprising: an optical platform (1a), wherein a left-right direction of the optical platform (1a) is defined as an x-axis, a front-rear direction is defined as a y-axis, and a vertical direction is defined as a z-axis; wherein the optical platform (1a) is equipped with:

a U-shaped electromagnet (8), comprising a U-shaped yoke (8c) and two wire wraps (8b), wherein the U-shaped yoke (8c) is vertically mounted on the optical platform (1a), and two U-shaped arms of the U-shaped yoke symmetrically arranged according to the y-axis; the two wire wraps (8b) are respectively provided on opposite faces of the two U-shaped arms, and are also symmetrically arranged according to the y-axis;

a 2-dimensional moving platform (7) mounted to a left of the U-shaped electromagnet (8) on the optical platform (1a) along the x-axis, wherein the 2-dimensional moving platform (7) comprises a first carrier platform which is moveable along the x-axis and the y-axis; a first damper (6b) and a second damper (6c) are vertically installed on the first carrier platform and are arranged in a line along the x-axis; a first through hole and a second through hole with equal sizes are respectively drilled on the first damper (6b) and the second damper (6c); the first through hole and the second through hole are coaxial and an axis thereof is parallel to the x-axis; an extending line of the axis of the first through hole and the second through hole passes directly above a center point between the two wire wraps (8b) of the U-shaped electromagnet (8); a guiding tube (6a) is coaxially clamped in both the first through hole of the first damper (6b) and the second through hole of the second clamper (6c); a tungsten wire (6d) is coaxially provided in the guiding tube (6a), and a right end of the tungsten wire (6d) extends out of a right end of the guiding tube (6a); a left end of the guiding tube (6a) is connected to a positive electrode of an external power source, and the right end of the guiding tube (6a) extends directly above the center point between the two wire wraps (8b) of the U-shaped electromagnet (8);

a 1-dimensional moving platform (9) mounted to a right of the U-shaped electromagnet (8) on the optical platform (1a) along the x-axis, wherein the 1-dimensional moving platform (9) comprises a second carrier platform which is moveable along the z-axis; a third damper (10b) is vertically installed on the second carrier platform and a third through hole is drilled on the third clamper (10b); the third through hole on the third clamper (10b) is coaxial with the first through hole and the second through hole on the first clamper (6b) and the second clamper (6c); a sparking plug (10a) is coaxially clamped in the third through hole of the third clamper (10b) on the second carrier platform; a right end of the sparking plug (10a) is connected to a negative electrode of the external power source, and a left end of the sparking plug (10a) extends directly above the center point between the two wire wraps (8b) of the U-shaped electromagnet (8); the sparking plug (10a) is moveable with the second carrier platform to a position wherein the left end of the sparking plug (10a) is directed to the tungsten wire (6d) extending out of the right end of the guiding tube (6a) in the 2-dimensional moving platform (7);

a transparent sealing tank (1g) mounted on the optical platform (1a) in a sealed form and covering the 2-dimensional moving platform (7), the 1-dimensional moving platform (9) and the U-shaped electromagnet (8), wherein a fourth through hole corresponding to the left end of the guiding tube (6a) of the 2-dimensional moving platform (7) is drilled on a left side of the transparent sealing tank (1g); a gas inlet (1d) is also provided at the left side of the transparent sealing tank (1g), and is connected to an external argon source; a vacuum vent (1j) is provided at a right side of the transparent sealing tank (1g); a fifth through hole corresponding to a position which is directly above the center point between the two wire wraps (8b) of the U-shaped electromagnet (8) is drilled on a top of the transparent sealing tank (1g); a pair of operation holes (1b), which are arranged in a line along the left-right direction, are drilled on a front side of the transparent sealing tank (1g), and rotating sheets (1c) are respectively mounted on the operation holes (1b) on the front side of the transparent sealing tank (1g) in a rotating cover form; and an image monitoring system (2) mounted on a rear of the transparent tank (1g) on the optical platform (1a), wherein the image monitoring system (2) comprises a supporting frame (2h), and a bottom end of the supporting frame (2h) is mounted on the optical platform (1a); a top end of the supporting frame (2h) extends forwards to the top of the transparent sealing tank (1g); a z-axis rectangle rail platform (2f) is mounted on the top end of the supporting frame (2h), and a sliding platform along the z-axis is provided on the z-axis rectangle rail platform (2f); a charge-coupled device camera (2d) is mounted on the sliding platform through a fixer; a third-generation infinite beam structure lens (2c) is installed on the charge-coupled device camera (2d), and is hung above the fifth through hole on the top of the transparent sealing tank (1g) in a vertically downward form; a micro objective (2a) is coaxially mounted on the third-generation infinite beam structure lens (2c); the micro objective (2a) extends into the transparent tank (1g) through the fifth through hole on the top of the transparent tank (1g), and a rubber ring is provided between the micro objective (2a) and the fifth through hole for sealing.

A tungsten wire material supplier (3) is also provided on the optical platform (1a) and mounted to a left of the fourth through hole on the left side of the transparent sealing tank (1g) along the x-axis; the tungsten wire material supplier (3) comprises a supporter (3a), and a roller (3b) is installed on the supporter (3) and rotatable around a center axis of the supporter (3) along the y-axis; the tungsten wire (6d) in the guiding tube wire (6a) of the 2-dimensional moving platform (7) is supplied by the tungsten wire material supplier (3); the tungsten wire (6d) is winded on the roller (3b); after passing through the fourth through hole on the left side of the transparent sealing tank (1g), the tungsten wire (6d) extends into the guiding tube (6a) through the left end of the guiding tube (6a), and then extends out of the right end of the guiding tube (6a).

A tungsten wire fixing device (4) is also provided on the optical platform (1a); the tungsten wire fixing device (4) comprises a vertical supporter (4a), and a wire feeding tube (4b) is mounted on a top end of the vertical supporter (4a); a center axis of the wire feeding tube (4b) is coaxial with the guiding tube (6a) of the 2-dimensional moving platform (7); the tungsten wire (6d) from the tungsten wire material supplier (3) passes through the wire feeding tube (4b) before entering the transparent sealing tank (1g).

A wire feeding roller (5) is also provided on the optical platform (1a) and mounted between a tungsten wire fixing device (4) and the transparent sealing tank (1g) of the optical platform (1a); the wire feeding roller (5) comprises a fixing part (5a); a pressing roller (5c) and a driving wheel (5d) are mounted on the fixing part (5a); center axes of the pressing roller (5c) and the driving wheel (5d) are respectively along the y-axis, and the pressing roller (5c) and the driving wheel (5d) are arranged in a line along the vertical direction; a motor driving the driving wheel (5d) is provided inside the fixing part (5a); the tungsten wire (6d) from the tungsten wire material supplier (3) passes between the pressing roller (5c) and the driving wheel (5d) before entering the transparent sealing tank (1g).

Advantages of the present invention are as follows:

1) the tungsten wire is directly used as an electrode, and the micro probe ball tip is formed by melting a tip of the tungsten wire with a high temperature, in such a manner that the probe ball tip is integrated with the probe shaft without gluing;

2) the electromagnet is used for generating a magnetic field for neutralizing gravity with Ampere force, so as to reduce effects of gravity on sphericity and eccentricity;

3) the present invention adopts the image monitoring system for observing a manufacturing process of the probe ball tips in real time, so as to find a probe ball tip with best sphericity and determine optimum parameters.

4) the image monitoring system of the present invention is able to monitor a distance between the tip of the tungsten wire and another electrode, and it is able to set the distance between the tip of the tungsten wire and another electrode according to experimental requirements.

5) the present invention is in an argon atmosphere room, and an argon atmosphere prevents oxidation of tungsten balls.

These and other objectives, features, and advantages of the present invention will become apparent from the following detailed description, the accompanying drawings, and the appended claims.

DETAILED DESCRIPTION OF THE PREFERRED EMBODIMENT

Figure 8:
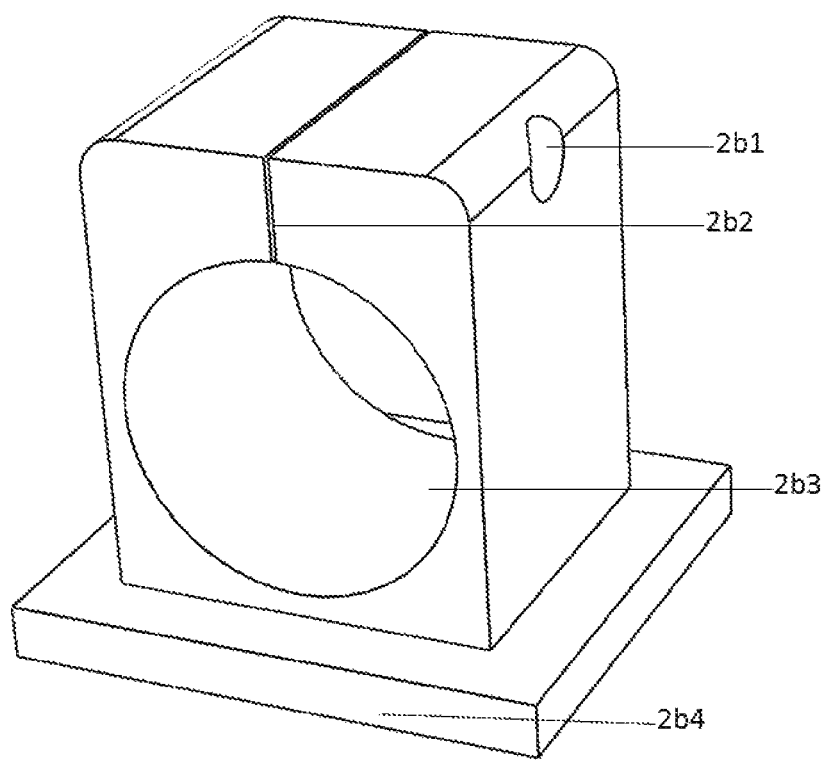
FIG. 8 is a perspective view of a clamper of a microscopic system of the present invention.

Referring to FIG. 8 of the drawings, a fabrication and monitoring device for micro probe ball tips comprises: an optical platform 1*a*, wherein a left-right direction of the optical platform 1*a* is defined as an x-axis, a front-rear direction is defined as a y-axis, and a vertical direction is defined as a z-axis; wherein the optical platform 1*a* is equipped with:

a U-shaped electromagnet 8, comprising a U-shaped yoke 8*c* and two wire wraps 8*b*, wherein the U-shaped yoke 8*c* is vertically mounted on the optical platform 1*a*, and two U-shaped arms of the U-shaped yoke symmetrically are arranged according to the y-axis; the two wire wraps 8*b* are respectively provided on opposite faces of the two U-shaped arms, and are also symmetrically arranged according to the y-axis;

a 2-dimensional moving platform 7 mounted to a left of the U-shaped electromagnet 8 on the optical platform 1*a* along the x-axis, wherein the 2-dimensional moving platform 7 comprises a first carrier platform which is moveable along the x-axis and the y-axis; a first damper 6*b* and a second damper 6*c* are vertically installed on the first carrier platform and are arranged in a line along the x-axis; a first through hole and a second through hole with equal sizes are respectively drilled on the first damper 6*b* and the second clamper 6*c*; the first through hole and the second through hole are coaxial and an axis thereof is parallel to the x-axis; an extending line of the axis of the first through hole and the second through hole passes directly above a center point between the two wire wraps 8*b* of the U-shaped electromagnet 8; a guiding tube 6*a* is coaxially clamped in both the first through hole and the second through hole of the first clamper 6*b* and the second clamper 6*c*; a tungsten wire 6*d* is coaxially provided in the guiding tube 6*a*, and a right end of the tungsten wire 6*d* extends out of a right end of the guiding tube 6*a*; a left end of the guiding tube 6*a* is connected to a positive electrode of an external power source, and the right end of the guiding tube 6*a* extends directly above the center point between the two wire wraps 8*b* of the U-shaped electromagnet 8;

a 1-dimensional moving platform 9 mounted to a right of the U-shaped electromagnet 8 on the optical platform 1*a* along the x-axis, wherein the 1-dimensional moving platform 9 comprises a second carrier platform which is moveable along the z-axis; a third damper 10*b* is vertically installed on the second carrier platform and a third through hole is drilled on the third clamper 10*b*; the third through hole on the third clamper 10*b* is coaxial with the first through hole and the second through hole on the first clamper 6*b* and the second clamper 6*c*; a sparking plug 10*a* is coaxially clamped in the third through hole of the third damper 10*b* on the second carrier platform; a right end of the sparking plug 10*a* is connected to a negative electrode of the external power source, and a left end of the sparking plug 10*a* extends directly above the center point between the two wire wraps 8*b* of the U-shaped electromagnet 8; the sparking plug 10*a* is moveable with the second carrier platform to a position wherein the left end of the sparking plug 10*a* is directed to the tungsten wire 6*d* extending out of the right end of the guiding tube 6*a* in the 2-dimensional moving platform 7;

a transparent sealing tank 1*g* mounted on the optical platform 1*a* in a sealed form and covering the 2-dimensional moving platform 7, the 1-dimensional moving platform 9 and the U-shaped electromagnet 8, wherein a fourth through hole corresponding to the left end of the guiding tube 6*a* of the 2-dimensional moving platform 7 is drilled on a left side of the transparent sealing tank 1*g*; a gas inlet 1*d* is also provided at the left side of the transparent sealing tank 1*g*, and it is connected to an external argon source; a vacuum vent 1*j* is provided at a right side of the transparent sealing tank 1*g*; a fifth through hole corresponding to a position which is directly above the center point between the two wire wraps 8*b* of the U-shaped electromagnet 8 is drilled on a top of the transparent sealing tank 1*g*; a pair of operation holes 1*b*, which are arranged in a line along the left-right direction, are drilled on a front side of the transparent sealing tank 1*g*, and rotating sheets 1*c* are respectively mounted on the operation holes 1*b* on the front side of the transparent sealing tank 1*g* in a rotating cover form; and an image monitoring system 2 mounted on a rear of the transparent tank 1*g* on the optical platform 1*a*, wherein the image monitoring system 2 comprises a supporting frame 2*h*, and a bottom end of the supporting frame 2*h* is mounted on the optical platform 1*a*; a top end of the supporting frame 2*h* extends forwards to the top of the transparent sealing tank 1*g*; a z-axis rectangle rail platform 2*f* is mounted on the top end of the supporting frame 2*h*, and a sliding platform, which is moveable along the z-axis is provided on the z-axis rectangle rail platform 2*f*; a charge-coupled device camera 2*d* is mounted on the sliding platform through a fixer; a third-generation infinite beam structure lens 2*c* is installed on the charge-coupled device camera 2*d*, and is hung above the fifth through hole on the top of the transparent sealing tank 1*g* in a vertically downward form; a micro objective 2*a* is coaxially mounted on the third-generation infinite beam structure lens 2*c*; the micro objective 2*a* extends into the transparent tank 1*g* through the fifth through hole on the top of the transparent tank 1*g*, and a rubber ring is provided between the micro objective 2*a* and the fifth through hole for sealing.

A tungsten wire material supplier 3 is also provided on the optical platform 1*a* and mounted to a left of the fourth through hole on the left side of the transparent sealing tank 1*g* along the x-axis; the tungsten wire material supplier 3 comprises a supporter 3*a*, and a roller 3*b* is installed on the supporter 3 and rotatable around a center axis of the supporter 3 along the y-axis; the tungsten wire 6*d* in the guiding tube 6*a* of the 2-dimensional moving platform 7 is supplied by the tungsten wire material supplier 3; the tungsten wire 6*d* is winded on the roller 3*b*; after passing through the fourth through hole on the left side of the transparent sealing tank 1*g*, the tungsten wire 6*d* extends into the guiding tube 6*a* through the left end of the guiding tube 6*a*, and then extends out of the right end of the guiding tube 6*a*.

A tungsten wire fixing device 4 is also provided on the optical platform 1*a*; the tungsten wire fixing device 4 comprises a vertical supporter 4*a*, and a wire feeding tube 4*b* is mounted on a top end of the vertical supporter 4*a*; a center axis of the wire feeding tube 4*b* is coaxial with the guiding tube 6*a* of the 2-dimensional moving platform 7; the tungsten wire 6*d* from the tungsten wire material supplier 3 passes through the wire feeding tube 4*b* before entering the transparent sealing tank 1*g*.

A wire feeding roller 5 is also provided on the optical platform 1*a* and mounted between a tungsten wire fixing device 4 and the transparent sealing tank 1*g* of the optical platform 1*a*; the wire feeding roller 5 comprises a fixing part 5a; a pressing roller 5c and a driving wheel 5d are mounted on the fixing part 5a; center axes of the pressing roller 5c and the driving wheel 5d are respectively along the y-axis, and the pressing roller 5c and the driving wheel 5d are arranged in a line along the vertical direction; a motor driving the driving wheel 5d is provided inside the fixing part 5a; the tungsten wire 6d from the tungsten wire material supplier 3 passes between the pressing roller 5c and the driving wheel 5d before entering the transparent sealing tank 1g.

Conventionally, assembly is accomplished by gluing. However, a probe ball tip and a probe shaft are not coaxial, resulting in an eccentric error. Therefore, the present invention adopts an arc discharge principle, and directly uses the tungsten wire as a positive electrode which discharges with the negative electrode of the power source. An arc is formed between a tip of the tungsten wire and another electrode, and a high-energy region inside the arc can melt the tip of the tungsten wire. The tip of the tungsten wire is melted into liquid due to a high temperature melt into liquid, and finally forms a micro probe ball tip after solidification.

During solidifying and naturally shrinking of a droplet, the droplet is in a molten and expanded state. The molten vertically solidifies towards a gravity direction. Therefore, the gravity will generate an error. The present invention uses the electromagnet to generate an electromagnetic field, and generates an Ampere force by a current-carrying conductor in the electromagnetic field. Therefore, neutralizing the gravity with the Ampere force can reduce or even eliminate gravity effects on eccentricity of the probe ball tip.

Figure 1:
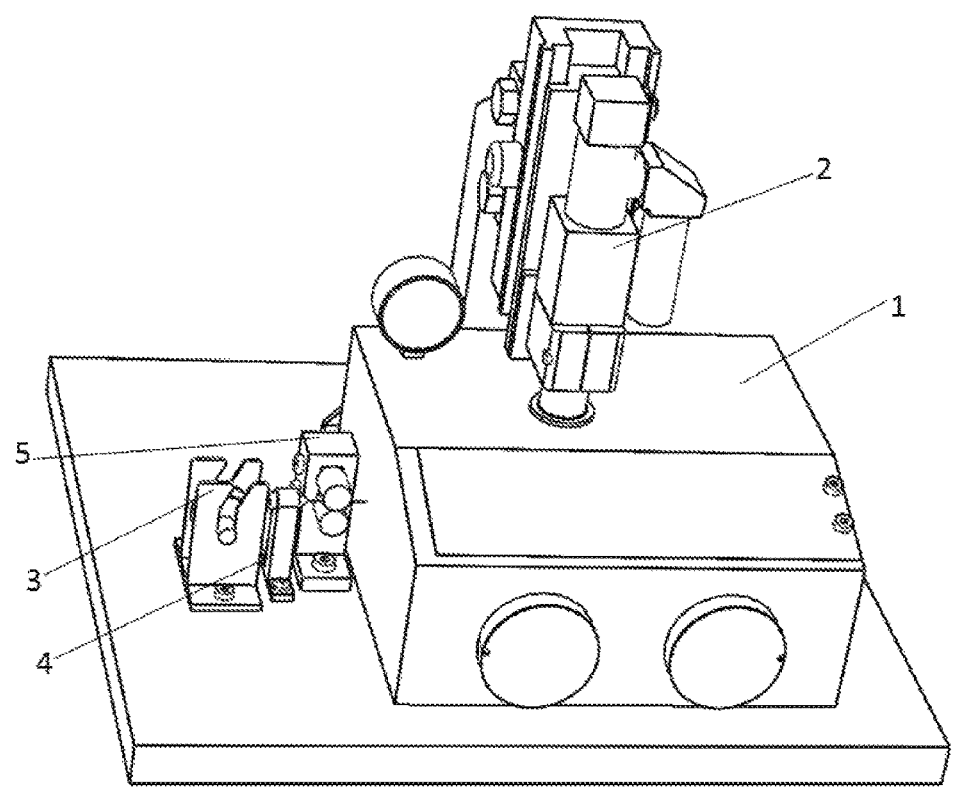
FIG. 1 is a perspective view of the present invention.
Figure 2:
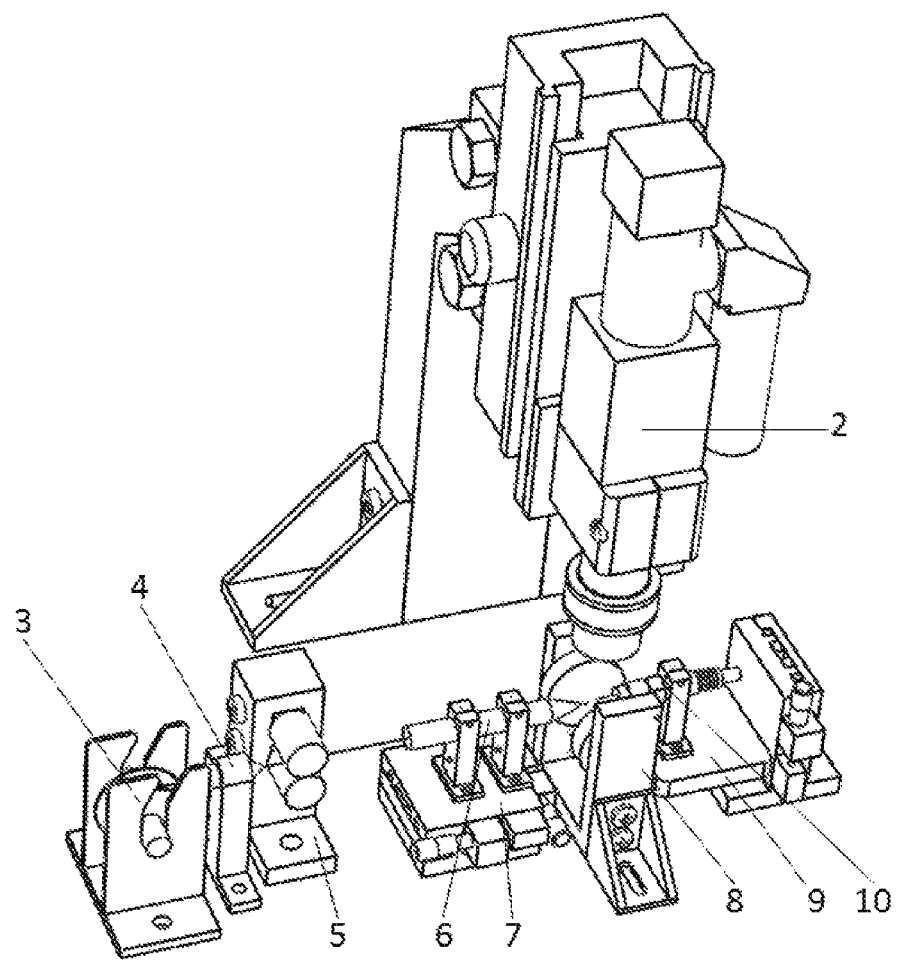
FIG. 2 is a perspective view of the present invention after removing covers.
Figure 3:
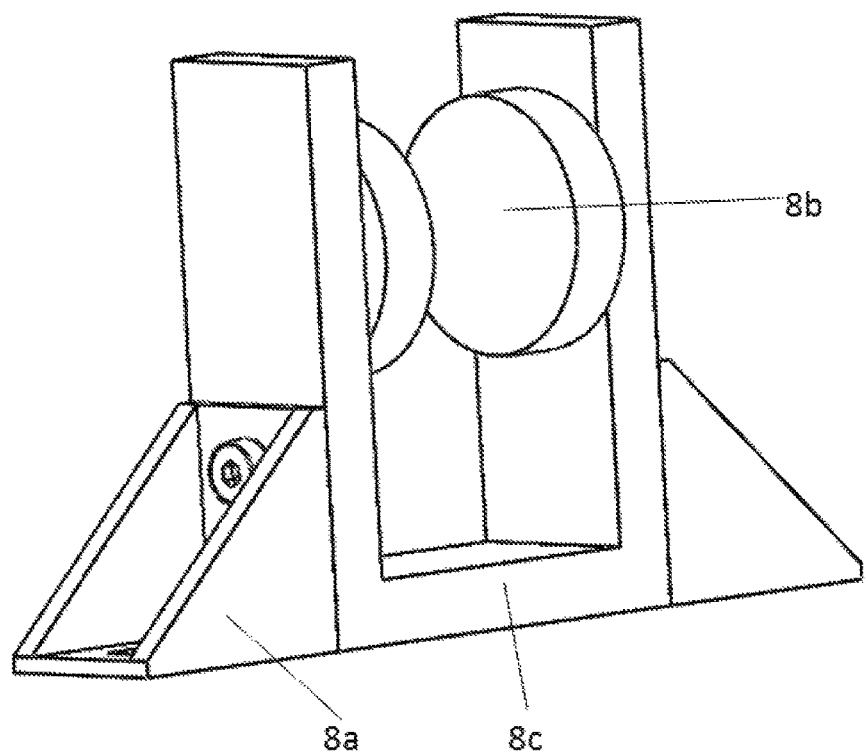
FIG. 3 is a perspective view of a magnet field generating system of the present invention.
Figure 6:
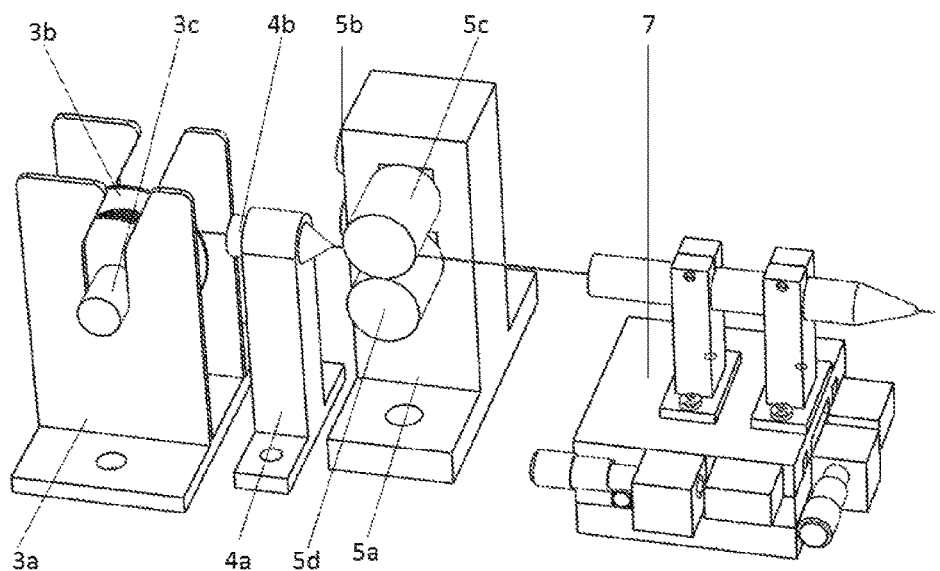
FIG. 6 is a perspective view of a wire feeding structure of the present invention.
Figure 7:
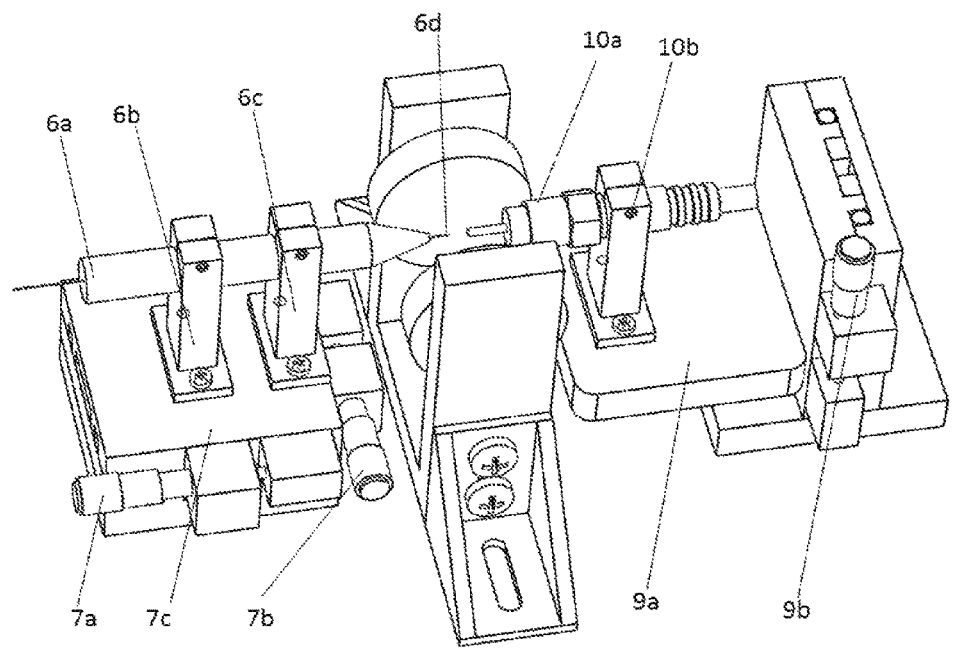
FIG. 7 is a perspective view of a 3-dimensional displacement adjusting mechanism of the present invention.

Referring to FIG. 1, the present invention comprises the optical platform 1a, and a magnetic field generator is provided on the optical platform 1a as shown in FIG. 3. The U-shaped electromagnet 8 is on the optical platform 1a, comprising the U-shaped yoke 8c and the wire wraps 8b. A front face and a rear face of the U-shape electromagnet 8 are fixed with aluminum corner pieces 8a. A first face of the aluminum corner piece 8a is fixed on the optical platform 1a by two fixing blots, and a second face of the aluminum corner piece 8a is fixed on a side face of the U-shaped electromagnet 8 by two fixing bolts. The 2-dimensional moving platform 7 is mounted to the left of the U-shaped electromagnet 8, The first carrier platform is able to move along the x-axis by operating an x-axis micrometer screw rod 7a, and able to move along the y-axis by operating a y-axis micrometer screw rod 7b. The 1-dimensional moving platform 9 is mounted to the right of the U-shaped electromagnet 8, and the second carrier platform of the 1-dimensional moving platform 9 is able to move along the z-axis by operating a z-axis micrometer screw rod 9b. Center axes of the 2-dimensional platform 7, the 1-dimensional platform 9 and the U-shaped electromagnet 8 are coaxial. By assembling the 2-dimensional platform 7 with the 1-dimensional platform 9, the tungsten wire 6d can be 3-dimensionally adjusted to aim at the sparking plug 10a. The distance between the tip of the tungsten wire 6d and a top of the sparking plug 10a can also be adjusted. Referring to FIG. 7, the 2-dimensional platform and the 1-dimensional platform 9 are both fixed on the optical platform 1a by screws. The image monitoring system 2 is directly above the U-shaped electromagnet 8. A wire feeding mechanism is provided to the left of the 2-dimensional moving platform 7, as shown in FIG. 6.

Referring to FIG. 7, in the high-precision fabrication and monitoring device, the first clamper 6b and the second damper 6c are mounted on the top of the 2-dimensional moving platform 7, and are both arranged at a center axis of the first carrier platform 7c. The first through hole and the second through hole with equal sizes are respectively drilled on the first clamper 6b and the second clamper 6c; the first through hole and the second through hole are coaxial. The guiding tube 6a is coaxially clamped in both the first through hole and the second through hole, and the tungsten wire 6d is provided in a thin hole of the guiding tube 6a. The guiding tube 6a is a pencil-shaped column whose center has the thin hole. A diameter of the thin hole is slight larger than that of the tungsten wire 6d. The guiding tube 6a is fixed on tops of the first clamper 6b and the second clamper 6c by fixing bolts. Each frame is fixed on the first carrier platform 7c by two fixing bolts.

The third clamper 10b is mounted on the 1-dimensional moving platform 9 and arranged at the center axis thereof. Third through hole of the third damper 10b is coaxial with the first through hole and the second through hole on the 2-dimensional moving platform 7. The sparking plug 10a is fixed on a top of the third damper 10b by fixing bolts. The negative electrode of the power source is connected to a tail of the sparking plug 10a by welding. The positive electrode of the power source is connected to a tail of the guiding tube 6a.

Figure 4:
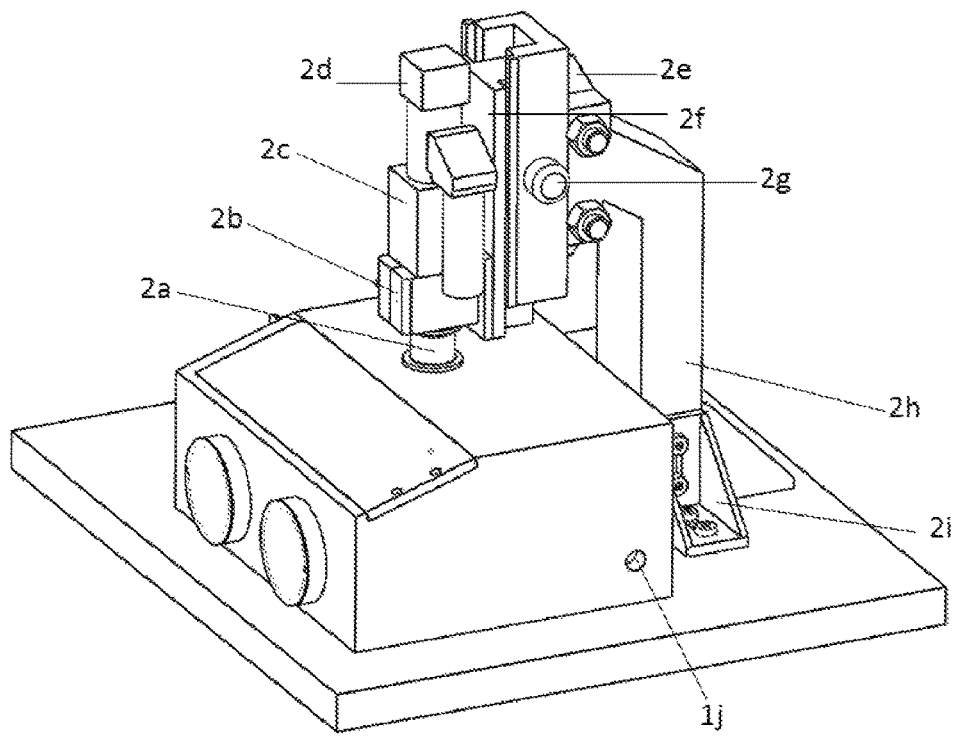
FIG. 4 is a perspective view of an image monitoring system of the present invention.

Referring to FIG. 4, in the high-precision fabrication and monitoring device, the image monitoring system 2 is provided above the U-shaped electromagnet 8, which is also called a microscopic imaging module. The micro objective 2a is proved at a bottom, and the third-generation infinite beam structure lens 2c is arranged above the micro objective 2a. The charge-coupled device camera 2d is provided above the third-generation infinite beam structure lens 2c. The microscopic imaging module is mounted on the z-axis rectangle rail platform 2f through a fixing damper 2b. A center of the fixing clamper 2b has a through hole 2b3, and a tiny rectangle 2b2 is provided at a right side of the through hole 2b3. A small hole 2b1 is provided at a vertical face of the tiny rectangle 2b2. Through the small hole 2b1, the microscopic imaging module is mounted by the fixing bolts, as shown in FIG. 8. Fine adjusting knobs 2g are provided at both sides of the z-axis rectangle rail platform 2f The microscopic imaging module is movable along the z-axis by operating the fine adjusting knobs 2g. The supporting frame 2h is provided at a rear of and connected to the z-axis rectangle rail platform 2f through a connector 2e. A bottom of the supporting frame 2h coincides with and mounted on the optical platform 1a through aluminum corner pieces 2i.

Referring to FIG. 6, in the high-precision fabrication and monitoring device, a wire feeder is provided to the left of the 2-dimensional moving platform 7. The wire feeding roller 5 is provided closely to the left of the 2-dimensional moving platform 7. The pressing roller 5c is provided at a top, and the driving wheel 5d is provided below the pressing roller 5c. The driving wheel 5b is driven by the motor, which is mounted inside a slot of the fixing part 5a. A round hole is drilled on a left of the slot for mounting and locking the motor by fixing bolts. The tungsten wire fixing device 4 is provided to the left of the wire feeding roller 5, comprising the vertical supporter 4a and the wire feeding tube 4b. The tungsten wire 6d is prevented from being in a wrong position by the wire feeding tube 4b and the guiding tube 6a at both sides of the wire feeding roller 5. The tungsten wire material supplier 3 is provided at a most left position, comprising a supporter 3a at a most bottom, a shaft 3c and a roller 3b.

Figure 5:
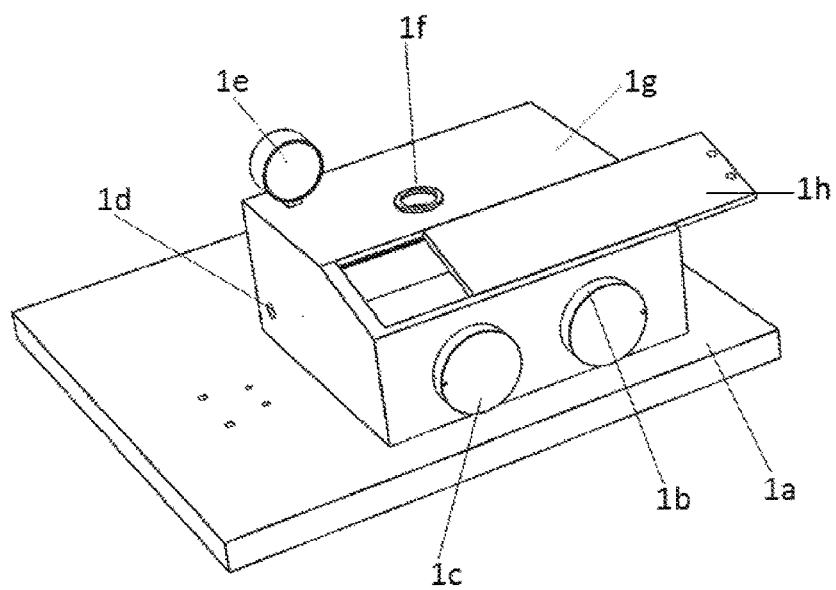
FIG. 5 is a perspective view of the covers of the present invention.

Referring to FIG. 4, in the high-precision fabrication and monitoring device, the transparent tank 1g covers the 2-dimensional moving platform 7, the 1-dimensional moving platform 9 and the U-shaped electromagnet 8, also shown in FIG. 5. The fifth through hole is drilled on the top of the transparent sealing tank 1g. The rubber ring if is sleeved on the fifth through hole. The micro objective 2a enters the transparent sealing tank 1g through the fifth through hole and contacts with the rubber ring if closely. A helium inlet 1d is drilled on the left of the transparent sealing tank 1g, and the vacuum vent 1j is drilled on the right of the transparent sealing tank 1g. The two large operation holes 1b are provided at the front of the transparent sealing tank 1g, the rotating sheets 1c are provided at outer sides of the operation holes 1b. The rotating sheets are fixed by fixing bolts. When the fixing bolts are loosened, the operating holes can be opened by rotating the rotating sheets 1c.

The present invention achieves electromagnetic generating, 3-dimensional adjusting, tungsten wire feeding and image monitoring.

Before the experiment, the operating holes 1b in the front of the transparent sealing tank 1g were opened. Relative positions and a distance between the guiding tube 6a and the sparking plug 10a were roughly adjusted, in such a manner that tops of the guiding tube 6a and the sparking plug 10a were in a line and the distance there between was roughly adjusted. Then a distance between the micro objective 2a and the tip of the tungsten wire 6d was adjusted by the fine adjusting knobs 2g of the image monitoring system 2 until the tip of the tungsten wire 6d was clearly seen.

After that, a target distance S was set and sent to the motor by a controller. The motor drove the driving wheel 5d to rotate, so as to drive the pressing roller 5c to rotate and move the tungsten wire 6d forwards. The tungsten wire 6d passed through and extended out of the guiding tube 6. The image monitoring system 2 shot a picture of the tip of the tungsten wire 6d and the top of the sparking plug 10a. After software processing, a distance S1 between the tip of the tungsten wire 6d and the top of the sparking plug 10a was obtained. Because a feedback system was embedded in the controller, the system would compare the S1 with S. If S1 was small than S, the controlling would keep the motor moving, so as to keep the tungsten wire 6d moving forwards until S1 equaled S, and vice versa. Through such negative feedback control, the distance S1 between the tip of the tungsten wire 6d and the top of the sparking plug 10a was strictly controlled, with a minimum accuracy up to 1 mm. Furthermore, the controlled could also control a feeding speed of the wire feeding mechanism, which further improved performances of the wire feeding mechanism.

After adjusting the distance S1 between the tip of the tungsten wire 6d and the top of the sparking plug 10a, a fine adjust was required because the tungsten wire 6d might be bent, resulting in that the tip of the tungsten wire 6d was not in line with the top of the sparking plug 10a. After the fine adjust, the operating holes 1b were closed. An air pump was used for driving air out from the vacuum vent 1j. Then argon gas was injected through the gas inlet 1d until 1 atm was reached. A pressure was observed by a barometer 1e.

After preparatory work, an electromagnetic power source was turned on, as well as a high-voltage pulse power source between the tungsten wire 6d and the sparking plug 10a. According to an electric arc discharge principle, an electric arc would be produced between the positive and the negative electrodes. Since the tungsten wire 6d was directly used as the positive electrode, the tungsten wire 6d was melt due to a high temperature, and formed a small ball under surface tension. According to neutralization between an Ampere force and the gravity, i.e. F=G=BIL, when B and I differed, the Ampere force would change. The controller would change B with current change, thus ensuring simulated weightlessness during the whole process.

Sphericity of the small ball tip would be affected by discharge time, discharge voltage, discharge frequency, peak current and distance between electrodes. Therefore, a program was pre-set in the controller of the present invention. According to the program, there were ranges of the discharge time, discharge voltage, discharge frequency, peak current and distance between electrodes. One of variable was regularly increased or decreased in degrees within the range without changing the others, so as to obtain a set of experimental data.

During melting the ball, the image monitoring system 2 continuously captured pictures, while a data acquisition card continuously sampled parameters such as voltage, current, voltage frequency, and discharge time. Each picture had a set of corresponding data. Finally, the change of ball quality could be observed from the pictures, thus obtaining corresponding parameter changes.

According to the experiment, it was known than when the discharge voltage is 600v, the discharge frequency is 100 Hz, the discharge time is 6 s to 14 s, and the distance between electrodes is 1-3 mm, the ball quality was the best with small sphericity and eccentric distance. In experiments with no magnetic field, a minimum sphericity was 0.5 μm. According to the present invention, the sphericity was less than 0.5 μm.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A fabrication and monitoring device for micro probe ball tips, comprising: an optical platform (1a), wherein a left-right direction of the optical platform (1a) is defined as an x-axis, a front-rear direction is defined as a y-axis, and a vertical direction is defined as a z-axis; wherein the optical platform (1a) is equipped with:

a U-shaped electromagnet (8), comprising a U-shaped yoke (8c) and two wire wraps (8b), wherein the U-shaped yoke (8c) is vertically mounted on the optical platform (1a), and two U-shaped arms of the U-shaped yoke symmetrically arranged according to the y-axis; the two wire wraps (8b) are respectively provided on opposite faces of the two U-shaped arms, and are also symmetrically arranged according to the y-axis;

a 2-dimensional moving platform (7) mounted to a left of the U-shaped electromagnet (8) on the optical platform (1a) along the x-axis, wherein the 2-dimensional moving platform (7) comprises a first carrier platform which is moveable along the x-axis and the y-axis; a first damper (6b) and a second damper (6c) are vertically installed on the first carrier platform and are arranged in a line along the x-axis; a first through hole and a second through hole with equal sizes are respectively drilled on the first damper (6b) and the second clamper (6c); the first through hole and the second through hole are coaxial and an axis thereof is parallel to the x-axis; an extending line of the axis of the first through hole and the second through hole passes directly above a center point between the two wire wraps (8b) of the U-shaped electromagnet (8); a guiding tube (6a) is coaxially clamped in both the first through hole of the first damper (6b) and the second through hole of the second clamper (6c); a tungsten wire (6d) is coaxially provided in the guiding tube (6a), and a right end of the tungsten wire (6d) extends out of a right end of the guiding tube (6a); a left end of the guiding tube (6a) is connected to a positive electrode of an external power source, and the right end of the guiding tube (6a) extends directly above the center point between the two wire wraps (8b) of the U-shaped electromagnet (8);

a 1-dimensional moving platform (9) mounted to a right of the U-shaped electromagnet (8) on the optical platform (1a) along the x-axis, wherein the 1-dimensional moving platform (9) comprises a second carrier platform which is moveable along the z-axis; a third damper (10b) is vertically installed on the second carrier platform and a third through hole is drilled on the third clamper (10b); the third through hole on the third clamper (10b) is coaxial with the first through hole and the second through hole on the first clamper (6b) and the second clamper (6c); a sparking plug (10a) is coaxially clamped in the third through hole of the third damper (10b) on the second carrier platform; a right end of the sparking plug (10a) is connected to a negative electrode of the external power source, and a left end of the sparking plug (10a) extends directly above the center point between the two wire wraps (8b) of the U-shaped electromagnet (8); the sparking plug (10a) is moveable with the second carrier platform to a position wherein the left end of the sparking plug (10a) is directed to the tungsten wire (6d) extending out of the right end of the guiding tube (6a) in the 2-dimensional moving platform (7);

a transparent sealing tank (1g) mounted on the optical platform (1a) in a sealed form and covering the 2-dimensional moving platform (7), the 1-dimensional moving platform (9) and the U-shaped electromagnet (8), wherein a fourth through hole corresponding to the left end of the guiding tube (6a) of the 2-dimensional moving platform (7) is drilled on a left side of the transparent sealing tank (1g); a gas inlet (1d) is also provided at the left side of the transparent sealing tank (1g), and is connected to an external argon source; a vacuum vent (1j) is provided at a right side of the transparent sealing tank (1g); a fifth through hole corresponding to a position which is directly above the center point between the two wire wraps (8b) of the U-shaped electromagnet (8) is drilled on a top of the transparent sealing tank (1g); a pair of operation holes (1b), which are arranged in a line along the left-right direction, are drilled on a front side of the transparent sealing tank (1g), and rotating sheets (1c) are respectively mounted on the operation holes (1b) on the front side of the transparent sealing tank (1g) in a rotating cover form; and an image monitoring system (2) mounted on a rear of the transparent tank (1g) on the optical platform (1a), wherein the image monitoring system (2) comprises a supporting frame (2h), and a bottom end of the supporting frame (2h) is mounted on the optical platform (1a); a top end of the supporting frame (2h) extends forwards to the top of the transparent sealing tank (1g); a z-axis rectangle rail platform (2f) is mounted on the top end of the supporting frame (2h), and a sliding platform along the z-axis is provided on the z-axis rectangle rail platform (2f); a charge-coupled device camera (2d) is mounted on the sliding platform through a fixer; a third-generation infinite beam structure lens (2c) is installed on the charge-coupled device camera (2d), and is hung above the fifth through hole on the top of the transparent sealing tank (1g) in a vertically downward form; a micro objective (2a) is coaxially mounted on the third-generation infinite beam structure lens (2c); the micro objective (2a) extends into the transparent tank (1g) through the fifth through hole on the top of the transparent tank (1g), and a rubber ring is provided between the micro objective (2a) and the fifth through hole for sealing.

2. The preparation and monitoring device, as recited in claim 1, wherein a tungsten wire material supplier (3) is also provided on the optical platform (1a) and mounted to a left of the fourth through hole on the left side of the transparent sealing tank (1g) along the x-axis; the tungsten wire material supplier (3) comprises a supporter (3a), and a roller (3b) is installed on the supporter (3) and rotatable around a center axis of the supporter (3) along the y-axis; the tungsten wire (6d) in the guiding tube wire (6a) of the 2-dimensional moving platform (7) is supplied by the tungsten wire material supplier (3); the tungsten wire (6d) is winded on the roller (3b); after passing through the fourth through hole on the left side of the transparent sealing tank (1g), the tungsten wire (6d) extends into the guiding tube (6a) through the left end of the guiding tube (6a), and then extends out of the right end of the guiding tube (6a).

3. The preparation and monitoring device, as recited in claim 2, wherein a tungsten wire fixing device (4) is also provided on the optical platform (1a); the tungsten wire fixing device (4) comprises a vertical supporter (4a), and a wire feeding tube (4b) is mounted on a top end of the vertical supporter (4a); a center axis of the wire feeding tube (4b) is coaxial with the guiding tube (6a) of the 2-dimensional moving platform (7); the tungsten wire (6d) from the tungsten wire material supplier (3) passes through the wire feeding tube (4b) before entering the transparent sealing tank (1g).

4. The preparation and monitoring device, as recited in claim 2, wherein a wire feeding roller (5) is also provided on the optical platform (1a) and mounted between a tungsten wire fixing device (4) and the transparent sealing tank (1g) of the optical platform (1a); the wire feeding roller (5) comprises a fixing part (5a); a pressing roller (5c) and a driving wheel (5d) are mounted on the fixing part (5a); center axes of the pressing roller (5c) and the driving wheel (5d) are respectively along the y-axis, and the pressing roller (5c) and the driving wheel (5d) are arranged in a line along the vertical direction; a motor driving the driving wheel (5d) is provided inside the fixing part (5a); the tungsten wire (6d) from the tungsten wire material supplier (3) passes between the pressing roller (5c) and the driving wheel (5d) before entering the transparent sealing tank (1g).

5. The preparation and monitoring device, as recited in claim 1, wherein a tungsten wire fixing device (4) is also provided on the optical platform (1a); the tungsten wire fixing device (4) comprises a vertical supporter (4a), and a wire feeding tube (4b) is mounted on a top end of the vertical supporter (4a); a center axis of the wire feeding tube (4b) is coaxial with the guiding tube (6a) of the 2-dimensional moving platform (7); the tungsten wire (6d) from a tungsten wire material supplier (3) passes through the wire feeding tube (4b) before entering the transparent sealing tank (1g).

6. The preparation and monitoring device, as recited in claim 1, wherein a wire feeding roller (5) is also provided on the optical platform (1a) and mounted between a tungsten wire fixing device (4) and the transparent sealing tank (1g) of the optical platform (1a); the wire feeding roller (5) comprises a fixing part (5a); a pressing roller (5c) and a driving wheel (5d) are mounted on the fixing part (5a); center axes of the pressing roller (5c) and the driving wheel (5d) are respectively along the y-axis, and the pressing roller (5c) and the driving wheel (5d) are arranged in a line along the vertical direction; a motor driving the driving wheel (5d) is provided inside the fixing part (5a); the tungsten wire (6d) from the tungsten wire material supplier (3) passes between the pressing roller (5c) and the driving wheel (5d) before entering the transparent sealing tank (1g).

\* \* \* \* \*